United States Patent
Munsell et al.

(10) Patent No.: US 9,415,772 B2
(45) Date of Patent: Aug. 16, 2016

(54) REAR DRIVE MODULE FOR A VEHICLE

(71) Applicant: Textron Inc., Providence, RI (US)

(72) Inventors: Trenton Munsell, Martinez, GA (US); Christopher K. Furman, Evans, GA (US)

(73) Assignee: Textron Innovations Inc., Providence, RI (US)

( * ) Notice: Subject to any disclaimer, the term of this patent is extended or adjusted under 35 U.S.C. 154(b) by 591 days.

(21) Appl. No.: 13/827,217

(22) Filed: Mar. 14, 2013

(65) Prior Publication Data
US 2014/0274553 A1 Sep. 18, 2014

(51) Int. Cl.
*B60W 20/00* (2016.01)

(52) U.S. Cl.
CPC ............ *B60W 20/40* (2013.01); *Y02T 10/6265* (2013.01); *Y10S 903/946* (2013.01); *Y10T 477/26* (2015.01)

(58) Field of Classification Search
CPC ... B60W 20/40; Y10T 477/23; Y10T 477/26; Y10T 477/79; Y02T 10/6265
See application file for complete search history.

(56) References Cited

U.S. PATENT DOCUMENTS

| 2007/0000707 | A1 | 1/2007 | Porter |
| 2009/0098976 | A1* | 4/2009 | Usoro et al. ............... 477/5 |
| 2009/0120710 | A1* | 5/2009 | Hasegawa ............ F16H 3/006 180/365 |
| 2010/0320016 | A1* | 12/2010 | Wang .................. B60K 6/48 180/65.22 |

FOREIGN PATENT DOCUMENTS

| EP | 2025570 A1 | 2/2009 |
| EP | 2439118 A1 | 4/2012 |
| JP | 2009029386 A | 2/2009 |
| WO | 2006067477 A1 | 6/2006 |

OTHER PUBLICATIONS

PCT Search Report, PCT US 2014/017134, mailed Jun. 19, 2014.

* cited by examiner

*Primary Examiner* — Huan Le
(74) *Attorney, Agent, or Firm* — Polster Lieder

(57) ABSTRACT

A utility vehicle having a first axle that is coupled to first and second wheels, an internal combustion engine that drives a first output shaft, an electric drive motor that drives a second output shaft, and a torque transfer device coupled to the first axle and the first and second output shafts. The torque transfer device is operable in a first mode to receive torque from the first output shaft only and output a motive force to the first axle, a second mode to receive torque from the second output shaft only and output the motive force, a third mode to receive torque from the first output shaft and the second output shaft simultaneously and output the motive force, and a fourth mode to receive torque from the first output shaft and output a drive force to the second output shaft cause the electrical drive motor to generate electrical power.

23 Claims, 1 Drawing Sheet

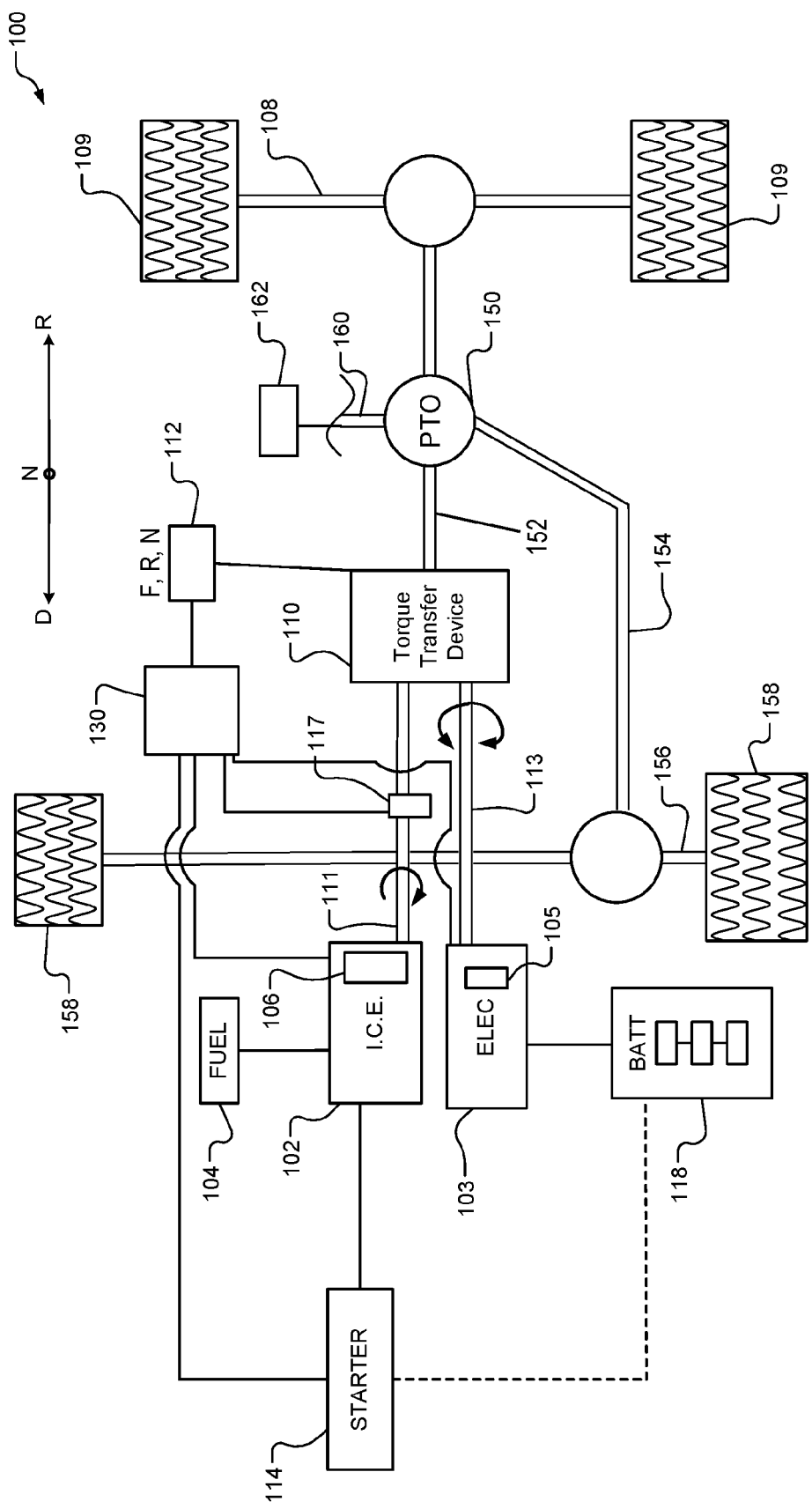

REAR DRIVE MODULE FOR A VEHICLE

FIELD

The present disclosure relates to hybrid utility vehicles having dual motive drive sources each operable to drive at least a single vehicle axle singly or in combination.

BACKGROUND

This section provides background information related to the present disclosure which is not necessarily prior art.

Utility vehicles, such as maintenance vehicles, cargo vehicles, shuttle vehicles, and golf cars include one primary mover, such as an electric motor or an internal combustion engine. Torque output by the primary mover drives two or more wheels of the vehicle to propel the vehicle. A control module may control operation of the vehicle based on one or more driver inputs.

SUMMARY

This section provides a general summary of the disclosure, and is not a comprehensive disclosure of its full scope or all of its features.

According to some embodiments of the present teachings, a utility vehicle is provided having an advantageous construction. The utility vehicle includes a first axle that is coupled to first and second wheels, an internal combustion engine that drives a first output shaft, an electric drive motor that drives a second output shaft, and a torque transfer device coupled to the first axle and the first and second output shafts. The torque transfer device is operable in a first mode to receive torque from the first output shaft only and output a motive force to the first axle, a second mode to receive torque from the second output shaft only and output the motive force to the first axle, a third mode to receive torque from the first output shaft and the second output shaft simultaneously and output the motive force to the first axle, and a fourth mode to receive torque from the first output shaft and output a drive force to the second output shaft to drive the electrical drive motor to generate electrical power.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 is a functional block diagram of a vehicle system according to some embodiments of the present teachings.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a functional block diagram of an example vehicle system 100 is presented. In some embodiments, the vehicle 100 is a maintenance vehicle, a cargo vehicle, a shuttle vehicle, a golf car, a hunting utility vehicle, a worksite vehicle, a buggy, a lightweight vehicle, or another suitable type of utility vehicle that is not designated for use on roadways. Utility vehicle 100 includes a first motive source 102, such as an internal combustion engine that combusts an air/fuel mixture within one or more cylinders (not shown) and a second motive source 103, such as an electrical drive motor.

A fuel system 104 provides fuel to the engine 102. Combustion of the air/fuel mixture within the engine 102 generates torque. The fuel may be, for example, gasoline, diesel fuel, or another suitable type of fuel. The engine 102 outputs torque to a transmission 106. For example only, the transmission 106 may include a continuously variable transmission (CVT) or another suitable type of transmission. The transmission 106 transfers torque to a rear axle 108 via a torque transfer device 110. Specifically, the transmission 106 outputs torque to the torque transfer device 110 via a transmission output shaft 111. When transferring torque output by the engine 102 to the torque transfer device 110, the transmission output shaft 111 rotates in only one direction.

In some embodiments, the electrical drive motor of second motive source 103 is, at least indirectly, coupled to the rear axle 108 to provide a secondary, independent or combinable with engine 102, drive system. Engine 102 and electrical drive motor 103 are coupled in parallel for input to torque transfer device 110. The electrical drive motor 103 draws electrical power from an electrical power storage device 118, such as one or more batteries, in a motive power mode and supplies electrical power to the electrical power storage device 118 in a power generation mode. The electrical power storage device 118 may include a plurality of individual batteries connected in series or connected in a combination of series and parallel. In some embodiments, the electrical power storage device 118 and/or the electrical drive motor 103 can be coupled to engine 102 for engine start.

Electrical drive motor 103 outputs torque to a transmission 105. For example only, the transmission 105 may include a continuously variable transmission (CVT) or another suitable type of transmission. The transmission 105 transfers torque to rear axle 108 via torque transfer device 110. Specifically, the transmission 105 outputs torque to the torque transfer device 110 via a transmission output shaft 113. In some embodiments, when transferring torque output by the electrical drive motor 103 to the torque transfer device 110, the transmission output shaft 113 rotates in a first direction. However, in some embodiments, as will be described, transmission output shaft 113 of electrical drive motor 103 can be driven in a second direction, opposite the first direction, to convert electrical drive motor 103 into a generator device generating and outputting a charge to the electrical power storage device 118. It should be noted from the discussion herein and the associated figure that engine 102 and electrical drive motor 103 can be coupled to torque transfer device 110 in parallel. It should also be noted that in some embodiments, electrical drive motor 103 can be driven in only a first direction. In this first direction, electrical drive motor 103 can apply drive torque to torque transfer device 110 to provide a motive power mode to drive the vehicle. However, a vehicle control module 130 can be used to permit electrical drive motor 103 to be driven in this first direction by engine 102 and thus generating and outputting a charge to the electrical power storage device 118. Therefore, in some embodiments, vehicle control module 130 can be used to achieve electrical power generation while electrical drive motor 103 is driven in the same direction as during the motive power mode.

The torque transfer device 110 includes a shift actuator 112 that regulates propulsion of the vehicle in one of three modes: a forward mode; a reverse mode; and a neutral mode. It should be recognized that torque transfer device 110 can further include a park mode to limit movement of the vehicle. Moreover, in some embodiments, a reverse mode of torque transfer device 110 can be eliminated (in torque transfer device 110 specifically) and a reverse drive function can be achieved through the reverse drive of electrical drive motor 103 using the forward mode of torque transfer device 110. When the torque transfer device 110 is in the forward mode, torque transfer device 110 can use input torque from shaft 111 of engine 102 and/or shaft 113 from electrical drive motor 103 to drive a drive shaft 152 in one direction to drive the rear axle 108 to propel the vehicle 100 in a forward direction. When the torque transfer device 110 is in the reverse mode, torque transfer device 110 can use input torque from shaft 111 of engine 102 and/or shaft 113 from electrical drive motor 103 to drive the drive shaft 152 in a second opposite direction to propel the vehicle 100 in a reverse direction. When the torque transfer device 110 is in the neutral mode, the torque transfer device 110 and the rear axle 108 are de-coupled for drive purposes, and input torque from shaft 111 of engine 102 and/or shaft 113 from electrical drive motor 103 is not transferred to the rear axle 108. The rear axle 108 drives one or more rear wheels 109.

As introduced above, in some embodiments, engine 102 can be used to, at least in part, drive transmission output shaft 113 of electrical drive motor 103 in a second direction to cause electrical drive motor 103 to generate and output electrical energy for use in driving electrical components of vehicle 100 and/or charging the electrical power storage device 118. It should be understood, however, that engine 102 can be used, in other embodiments, to drive transmission output shaft 113 of electrical drive motor 103 in the first direction (rather than the second, opposite direction). The necessary drive input to electrical drive motor 103 can be reversed or otherwise managed by transmission 105 of electrical drive motor 103. Engine 102 can thus drive electrical drive motor 103 in such a way as to convert mechanical energy output by the engine 102 into electrical power. Electrical drive motor 103 can output electrical power at a voltage comparable or generally equal to the electrical power storage device 118.

The electrical drive motor 103 can be, for example, an alternating current (AC) motor, a direct current (DC) motor, an induction motor, a brushless motor, a brush-based motor, or another suitable type of electric motor. The electrical drive motor 103 draws electrical power from the electrical power storage device 118 and outputs a drive torque along transmission output shaft 113. In some embodiments, more than one electrical drive motor 103 can be employed.

In some embodiments, the electrical drive motor 103 may be capable of outputting a greater amount of torque than the engine 102. Additionally, a magnitude of sound (e.g., in decibels) produced by operation of the electrical drive motor 103 is less than a magnitude of sound produced during operation of the engine 102. However, the engine 102 may be capable of achieving greater speeds than the electrical drive motor 103. Additionally, a range of the vehicle 100 (e.g., a maximum distance traveled) when operated using only the engine 102 may be greater than a range of the vehicle 100 when operated only using the electrical drive motor 103.

According to the present disclosure, in response to a user's selection, the vehicle 100 can be propelled in the forward direction or the reverse direction using only torque output by the engine 102 (Mode 1). The vehicle 100 can also be propelled in the forward direction or the reverse direction using only torque output by the electrical drive motor 103 (Mode 2). The vehicle 100 can also be propelled in the forward direction or the reverse direction using a combination of torque output by the electrical drive motor 103 and the engine 102 (Mode 3). When a combination of torque output by the electrical drive motor 103 and the engine 102 is used, the electrical drive motor 103 and the engine 102 may be controlled in tandem to best utilize the greater torque output capability and the quieter operation of the electrical drive motor 103 with the greater speed capability and greater range of the engine 102. The vehicle 100, and particularly torque transfer device 110, can be operated such that torque output by the engine 102 is used to drive the electrical drive motor 103 in an opposite direction to generate or otherwise produce electrical power for powering other electrical systems and/or charge the electrical power storage device 118 (Mode 4). When an output of the engine 102 is desired to drive the electrical drive motor 103 to produce electrical power, it should be appreciated that the vehicle 100 can be operated in the forward direction or reverse direction, or torque transfer device 110 can be placed in a neutral position to provide for stationary charging.

Still referring to FIG. 1, when it is desired to operate the vehicle 100 to propel it in the forward direction or the reverse direction using only torque output by the engine 102 (Mode 1), the output transmission shaft 111 is rotated in a first direction to transfer torque from engine 102 to torque transfer device 110. Torque transfer device 110 can be placed in the forward drive position or the reverse drive position to transfer the appropriate direction drive output torque along drive shaft 152 to the rear axle 108 and rear wheels 109. During this time, electrical drive motor 103 can be permitted to freely move or can be physically decoupled from torque transfer device 110 via decoupling linkages or other systems within torque transfer device 110. In this way, torque output from engine 102 is transferred to rear axle 108 to provide a motive force to drive vehicle 100. As used herein, the term "motive force" will be understood to be a generic term that generally describes the resulting force provided to propel the vehicle 100 in either the forward or reverse directions when operating the vehicle in any of the respective modes described herein.

When it is desired to operate the vehicle 100 to propel it in the forward direction or the reverse direction using only torque output by the electrical drive motor 103 (Mode 2), the output transmission shaft 113 is rotated in a first direction to transfer torque from electrical drive motor 103 to torque transfer device 110. Torque transfer device 110 can be placed in the forward drive position or the reverse drive position to transfer the appropriate direction drive output torque along drive shaft 152 to the rear axle 108 and rear wheels 109. During this time, engine 102 should be decoupled from torque transfer device 110 to prevent back driving of the engine 102. To this end, torque transfer device 100 can be configured to selectively decouple output shaft 111 therefrom via decoupling linkages or other systems within torque transfer device 110. In some embodiments, a clutch system 117 can be disposed along transmission output shaft 111 of engine 102 to selectively decouple engine 102 from torque transfer device 110. In this way, torque output from electrical drive motor 103 is transferred to rear axle 108 to provide a motive force to drive vehicle 100.

When it is desired to operate the vehicle 100 to propel it in the forward direction or the reverse direction using a combination of torque output by the engine 102 and the electrical drive motor 103 (Mode 3), the output transmission shaft 111 of engine 102 is rotated in a first direction to transfer torque from engine 102 to torque transfer device 110. Similarly, the output transmission shaft 113 of electrical drive motor 103 is rotated in a first direction to transfer torque from electrical drive motor 103 to torque transfer device 110. Torque transfer device 110 can be configured to receive input torque from engine 102 and electrical drive motor 103 and can be placed in the forward drive position or the reverse drive position to transfer the appropriate direction drive output torque to the rear axle 108 and rear wheels 109. In this way, torque output from engine 102 and electrical drive motor 103 is transferred to rear axle 108 to provide a motive force to drive vehicle 100.

In some embodiments, engine 102 can be used to drive electrical drive motor 103 in a generator mode to produce electrical power from electrical drive motor 103 to power vehicle electrical systems and/or charge the electrical power storage device 118 (Mode 4). In this way, the output transmission shaft 111 of engine 102 is rotated in a first direction to transfer torque from engine 102 to torque transfer device 110. Torque transfer device 110 is selectively engaged in a mode such that input torque from engine 102 (while clutch 117 is engaged) causes output transmission shaft 113 of electrical motor drive 103 to be driven in the second direction (opposite the first direction), thereby driving electrical motor drive 103 in a direction sufficient to operate in a generator mode resulting in electrical power generation. This electrical power can be immediately used by electrical systems of vehicle 100, power-demanding devices off-board of vehicle 100, and/or to charge the electrical power storage device 118. It is important to note that in the present mode, torque output from engine 102 can be used, in addition to driving electrical drive motor 103 in a generator mode, to drive vehicle 100 in the forward or reverse direction. That is, in this mode, engine 102 can be used to drive electrical drive motor 103 to produce electrical power while the vehicle 100 is stationary or engine 102 can be used to drive electrical drive motor 103 to produce electrical power while also providing motive force to drive vehicle 100.

It should be recognized that, in some embodiments, all drive motive force to propel vehicle 100 is delivered via a single torque transfer device 110. The engine 102 can be isolated from the torque transfer device 110 using the clutch 117. Moreover, in some embodiments, engine 102 and electrical drive motor 103 can be operably coupled together to propel the vehicle 100 or, when torque transfer device 110 is in a propulsion neutral position, engine 102 and electrical drive motor 103 can be operably coupled together via the torque transfer device 110 such that engine 102 drives electrical drive motor 103 in a power generation mode, thereby generating and outputting electrical power to the electrical power storage device 118 or other electrical system.

In some embodiments, vehicle 100 can comprise a power take-off (PTO) 150 positioned along a drive shaft 152 from torque transfer device 110. It should be understood, however, that PTO 152 can be operably coupled directly to torque transfer device 110, separate from drive shaft 152 interconnecting torque transfer device with rear axle 108. PTO 150 can be a transmission or clutch system capable of directing at least a portion of the drive torque of drive shaft 152 or torque transfer device 110 to a location separate from rear axle 108. In some embodiments, PTO 150 can be a transmission that transmits drive torque to a secondary drive shaft or system 154 operably coupled to a front axle 156, thereby driving one or more front wheels 158 of vehicle 100. In some embodiments, PTO 150 can be a splined or other connection 160 for coupling an implement or accessory 162 to vehicle 100. Implement or accessory 162 can include a mower, tiller, blade, or other working device.

In some embodiments, a vehicle control module 130 can be used and operably coupled to any one or all systems of vehicle 100 to provide a control logic and/or user interface to vehicle 100 and the various systems. A user can control vehicle control module 103 using any one or a number of control inputs, including, but not limited to switches, levers, pedals, and the like. Vehicle control module 130 controls the mode of operation of the torque transfer device 110 via the shift actuator 112. The vehicle control module 130 also controls operation of the starter generator unit 114, engine 102, electrical drive motor 103, clutch 117, and PTO 150. More specifically, the vehicle control module 130 may also control charging of the electrical power storage device 118 via the starter/generator unit 114. The vehicle control module 130 may also control operation of the torque transfer device 110, for example, for operation in the power generation mode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A utility vehicle comprising:
   a first axle that is coupled to first and second wheels;
   an internal combustion engine that drives a first output shaft;
   an electric drive motor that drives a second output shaft; and
   a torque transfer device selectively operably coupled to the first axle and the first output shaft and the second output shaft, the torque transfer device being operable in a first mode to receive torque from the first output shaft only and output motive force to the first axle, the torque transfer device being operable in a second mode to receive torque from the second output shaft only and output motive force to the first axle, the torque transfer device being operable in a third mode to receive torque from the first output shaft and the second output shaft simultaneously and output motive force to the first axle, the torque transfer device being operable in a fourth mode to receive torque from the first output shaft and output a drive force only to the second output shaft to drive the electrical drive motor to generate electrical power when the vehicle is stationary, wherein the torque transfer device comprises a shift actuator structured and operable to regulate propulsion of the vehicle between a forward mode, a reverse mode and a neutral mode.

2. The utility vehicle according to claim 1, further comprising:
   a clutch operably disposed between the internal combustion engine and the torque transfer device along the first output shaft, the clutch operable to selectively decouple the first output shaft from the torque transfer device in the second mode.

3. The utility vehicle according to claim 1 wherein, in the fourth mode, the torque transfer device is further operable to output motive force to the first axle.

4. The utility vehicle according to claim 1 wherein the electric drive motor drives the second output shaft in a first direction in the first mode, the second mode, and the third mode, and the second output shaft is driven in a second direction opposite the first direction in the fourth mode.

5. The utility vehicle according to claim 1 wherein motive force output to the first axle is operable to drive the first axle in a forward direction and a reverse direction.

6. The utility vehicle according to claim 1 wherein the electrical drive motor is operable to power a starter device for starting the internal combustion engine.

7. The utility vehicle according to claim 1, further comprising:
   a control module operable to control the internal combustion engine, the electric drive motor, and the torque transfer device in response to a user input.

8. The utility vehicle according to claim 1, further comprising:
   a control module operable to control at least one of the internal combustion engine, the electric drive motor, and the torque transfer device in response to at least indirect user input.

9. The utility vehicle according to claim 1, further comprising:
   an electrical power storage device operably coupled to the electric drive motor, the electrical power storage device being operable to output electrical power to the electrical motor in the second mode and the third mode, the electrical power storage device being operable to receive electrical power from the electrical drive motor in the fourth mode.

10. The utility vehicle according to claim 9 wherein the electrical power storage device comprises a plurality of batteries.

11. The utility vehicle according to claim 1, further comprising:
    a power takeoff device operably coupled to the torque transfer device, the power takeoff device operable to receive power input from the torque transfer device in the first mode, the second mode, and the third mode and output a power takeoff drive torque.

12. The utility vehicle according to claim 11, further comprising:
    a second axle that is coupled to third and fourth wheels, wherein the power takeoff device outputs motive force to the second axle.

13. A utility vehicle comprising:
    a first axle that is coupled to first and second wheels;
    an internal combustion engine that drives a first output shaft;
    an electric drive motor that drives a second output shaft;
    a torque transfer device selectively operably coupled to the first axle and the first output shaft and the second output shaft, the torque transfer device being operable in a first mode to receive torque from the first output shaft only and output motive force to the first axle, the torque transfer device being operable in a second mode to receive torque from the second output shaft only and output motive force to the first axle, the torque transfer device being operable in a third mode to receive torque from the first output shaft and the second output shaft simultaneously and output motive force to the first axle, the torque transfer device being operable in a fourth mode to receive torque from the first output shaft and output a drive force only to the second output shaft to drive the electrical drive motor to produce electrical power when the vehicle is stationary, wherein the torque transfer device comprises a shift actuator structured and operable to regulate propulsion of the vehicle between a forward mode, a reverse mode and a neutral mode; and an electrical power storage device operably coupled to the electric drive motor, the electrical power storage device being operable to output stored electrical power to the electrical motor in the second mode and the third mode, the electrical power storage device being operable to receive the produced electrical power from the electrical drive motor in the fourth mode to charge the electrical power storage device.

14. The utility vehicle according to claim 13, further comprising:
a clutch operably disposed between the internal combustion engine and the torque transfer device along the first output shaft, the clutch operable to selectively decouple the first output shaft from the torque transfer device in the second mode.

15. The utility vehicle according to claim 13 wherein, in the fourth mode, the torque transfer device is further operable to output motive force to the first axle in the fourth mode.

16. The utility vehicle according to claim 13 wherein the electrical power storage device comprises a plurality of batteries.

17. The utility vehicle according to claim 13 wherein the electric drive motor drives the second output shaft in a first direction in the first mode, the second mode, and the third mode, and the second output shaft is driven in a second direction opposite the first direction in the fourth mode.

18. The utility vehicle according to claim 13 wherein motive force output to the first axle is operable to drive the first axle in a forward direction and a reverse direction.

19. The utility vehicle according to claim 13 wherein the electrical drive motor is operable to power a starter device for starting the internal combustion engine.

20. The utility vehicle according to claim 13, further comprising:
a control module operable to control the internal combustion engine, the electric drive motor, and the torque transfer device in response to a user input.

21. The utility vehicle according to claim 13, further comprising:
a control module operable to control at least one of the internal combustion engine, the electric drive motor, and the torque transfer device in response to at least indirect user input.

22. The utility vehicle according to claim 13, further comprising:
a power takeoff device operably coupled to the torque transfer device, the power takeoff device operable to receive power input from the torque transfer device in the first mode, the second mode, and the third mode and output a power takeoff drive torque.

23. The utility vehicle according to claim 22, further comprising:
a second axle that is coupled to third and fourth wheels, wherein the power takeoff device outputs motive force to the second axle.

* * * * *